(12) United States Patent
Tsuneishi et al.

(10) Patent No.: US 12,741,407 B2
(45) Date of Patent: Sep. 22, 2026

(54) INJECTION MOLDING MACHINE AND CONTROL DEVICE OF INJECTION MOLDING MACHINE

(71) Applicant: SUMITOMO HEAVY INDUSTRIES, LTD., Tokyo (JP)

(72) Inventors: Kengo Tsuneishi, Chiba (JP); Hirotsugu Marumoto, Chiba (JP); Daigo Hotta, Chiba (JP); Hajime Ono, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 86 days.

(21) Appl. No.: 18/169,813

(22) Filed: Feb. 15, 2023

(65) Prior Publication Data

US 2023/0398725 A1 Dec. 14, 2023

(30) Foreign Application Priority Data

Jun. 13, 2022 (JP) ................................ 2022-095290

(51) Int. Cl.
*B29C 45/76* (2006.01)
*B29C 45/58* (2006.01)
*B29C 45/78* (2006.01)

(52) U.S. Cl.
CPC .............. *B29C 45/78* (2013.01); *B29C 45/58* (2013.01); *B29C 2945/7604* (2013.01);
(Continued)

(58) Field of Classification Search
CPC ....... B29C 45/17; B29C 45/76; B29C 45/766; B29C 45/768; B29C 45/78; B29C 45/1774; B29C 45/2737; B29C 45/84
See application file for complete search history.

(56) References Cited

U.S. PATENT DOCUMENTS 5,344,301 A * 9/1994 Kamiguchi ............. B29C 45/76
425/170
2003/0154004 A1* 8/2003 Kroeger .............. B29C 45/2737
700/202

(Continued)

FOREIGN PATENT DOCUMENTS

CN 106985332 A 7/2017
JP H05-24085 A 2/1993

(Continued)

OTHER PUBLICATIONS

Office Action of the corresponding DE 10 2023 112 151.0 mailed on Feb. 27, 2025.

(Continued)

*Primary Examiner* — Thu Khanh T. Nguyen
(74) *Attorney, Agent, or Firm* — WTA IP Law P.C.

(57) ABSTRACT

An injection molding machine includes: a cylinder that holds a molding material to be injected into a mold; a plasticizing member provided in the cylinder so as to be movable and rotatable; a temperature measurer that measures a temperature of the cylinder or of the mold; and a period setting unit configured to set a cold start prevention period, which is a period for restricting the injection of the molding material into the mold, based on the temperature measured by the temperature measurer until a temperature of the molding material or the temperature of the mold rises. The period setting unit stores temperature-time data in which the temperature measured by the temperature measurer is associated with time, and adjusts the cold start prevention period based on an actual temperature of the stored temperature-time data.

8 Claims, 8 Drawing Sheets

(52) U.S. Cl.
CPC ................. *B29C 2945/7619* (2013.01); *B29C 2945/76254* (2013.01); *B29C 2945/76531* (2013.01); *B29C 2945/76555* (2013.01); *B29C 2945/76668* (2013.01)

(56) References Cited

U.S. PATENT DOCUMENTS

| | | | | |
|---|---|---|---|---|
| 2020/0254670 | A1* | 8/2020 | Horiuchi | B29C 45/768 |
| 2020/0290258 | A1* | 9/2020 | Gehring | B29C 45/78 |
| 2020/0391423 | A1* | 12/2020 | Markut-Kohl | B29C 45/76 |
| 2022/0193970 | A1* | 6/2022 | Striegel | B29C 45/281 |

FOREIGN PATENT DOCUMENTS

| | | | |
|---|---|---|---|
| JP | H06-15004 | Y2 | 4/1994 |
| JP | H06-015004 | Y2 | 4/1994 |
| JP | H11-170327 | A | 6/1999 |
| JP | 2005-161777 | A | 6/2005 |

OTHER PUBLICATIONS

Office Action of the corresponding CN Application No. 202310186709.4 Mailed on Jan. 14, 2026.

* cited by examiner

PLASTICIZING MOTOR
INJECTION MOTOR
LOAD DETECTOR
CONTROL DEVICE
CPU
STORAGE MEDIUM
INPUT I/F
OUTPUT I/F
OPERATION DEVICE
DISPLAY DEVICE

10
L
100
150
200
800
FOURTH ZONE
THIRD ZONE
SECOND ZONE
FIRST ZONE
Z
X
Y
340
300
PLASTICIZING MOTOR
INJECTION MOTOR
LOAD DETECTOR
CONTROL DEVICE
CPU
STORAGE MEDIUM
INPUT I/F
OUTPUT I/F
OPERATION DEVICE
DISPLAY DEVICE
θ
180
181
182
183
184
185
170
151
152
153
154
220
210
120
826
801
820
810
110
320
331
315
330
313
312
311
341
350
351
360
301
102
161
160
130
520
101
400
314
401
310
411
420
410
412
402
436
435
900
910
920
700
701
702
703
704
2
930
433
432
431
430
770
750
760

| TIME | 15:54 | 15:55 | 15:56 | 15:57 | 15:58 | 15:59 | 16:00 | 16:01 | 16:02 | 16:03 | 16:04 | 16:05 | 16:06 | 16:07 | 16:08 |
|---|---|---|---|---|---|---|---|---|---|---|---|---|---|---|---|
| ACTUAL TEMPERATURE (°C) | 345 | 340 | 336 | 334 | 330 | 326 | 322 | 319 | 314 | 310 | 305 | 301 | 295 | 290 | 284 |

FIG. 7

| | | | 1 | 2 | 3 | 4 | 5 | 6 | 7 | 8 |
|---|---|---|---|---|---|---|---|---|---|---|
| CONDITION | HEATER CONTROL SELECTION IS CHANGED | | Y | Y | Y | N | Y | N | N | N |
| | HEATER CONTROL IS | ON | Y | Y | N | Y | N | Y | N | N |
| | | OFF | Y | N | Y | Y | N | N | Y | N |
| DETERMINATION RESULT | RECOGNIZED AS TRIGGER | | - | Y | | - | - | | | - |
| | NOT RECOGNIZED AS TRIGGER | | - | | Y | - | - | Y | Y | - |

TD
Tz
Tz
TIME
TEMPERATURE (°C)
16:00 16:01 16:02 16:03 16:04 16:05 16:06 16:07 16:08 16:09 16:10 16:11 16:12 16:13 16:14 16:15 16:16 16:17 16:18 16:19 16:20 16:21 16:22
250 249 249 252 - - - - - - - - - - 195 190 185 180 175 170 165 160 155
EVENT
POWER OFF
POWER ON
DETERMINATION OF COLD START PREVENTION PERIOD
BEFORE PREDETERMINED TIME

LINEAR INTERPOLATION
260
240
220
200
180
160
140
120
100
15:57
16:04
16:02
16:19
16:26
POWER OFF
POWER ON
DETERMINATION OF COLD START PREVENTION PERIOD

INJECTION MOLDING MACHINE AND CONTROL DEVICE OF INJECTION MOLDING MACHINE

CROSS-REFERENCE TO RELATED APPLICATIONS

This application claims priority to Japanese Patent Application No. 2022-095290, filed on Jun. 13, 2022, which is incorporated by reference herein in its entirety.

BACKGROUND

Technical Field

Certain embodiments of the present invention relate to an injection molding machine and a control device of an injection molding machine.

Description of Related Art

In an injection molding machine, a plurality of temperature measurers are provided in a cylinder, and a temperature of the cylinder is raised based on a temperature detected by each temperature measurer. However, when the injection molding machine is started, even if the temperature reaches a set temperature of a heater, a temperature of a molding material in the cylinder does not reach the set temperature. When a screw or the like is moved in a state where the temperature of the molding material is not sufficiently raised, an excessive load may be applied to a plasticizing member such as the screw, and damage or the like may be incurred. In addition, when the molding material is injected from the injection molding machine into a mold in a state where the temperature is not sufficiently raised, there is a possibility that the mold has a poor filling state, for example, the mold is bitten, a molding product is not released from the mold, or burrs are generated. In particular, in a case where the injection molding machine performs thermal curing molding (reaction molding), there are problems in that the molding material does not normally solidify, functional performance required for the molding product cannot be obtained, and the like.

Therefore, the injection molding machine sets a period (cold start prevention period) of waiting until the temperature of the molding material rises sufficiently, and performs interlocking for restricting an operation of the plasticizing member during the cold start prevention period.

However, in a situation where an operation of the injection molding machine is temporarily stopped due to a power failure, an operation error, or the like, and then immediately restarted, the temperature of the molding material or of the mold is high, and there are cases where a risk of damage to components is low. Even in this case, when the operation of the device is awaited for an initially set cold start prevention period, it takes time to restart the device. Therefore, the related art discloses an injection molding machine in which, when a time after an operation of the injection molding machine is stopped is equal to or shorter than a predetermined time, the operation of the injection molding machine is allowed based on a kind of resin and a stop time from stop of molding to restart.

SUMMARY

An injection molding machine according to an aspect of the present invention includes: a cylinder that holds a molding material to be injected into a mold; a plasticizing member provided in the cylinder so as to be movable and rotatable; a temperature measurer that measures a temperature of the cylinder or of the mold; and a period setting unit configured to set a cold start prevention period, which is a period for restricting an operation of the plasticizing member until a temperature of the molding material or the temperature of the mold rises, in which the period setting unit stores temperature-time data in which the temperature measured by the temperature measurer is associated with time, and sets the cold start prevention period based on an actual temperature of the stored temperature-time data.

A control device of an injection molding machine according to another aspect of the present invention allows a temperature measurer to measure a temperature of a cylinder that holds a molding material to be injected into a mold or a temperature of the mold and allows a temperature control mechanism to adjust the temperature of the cylinder or of the mold based on the temperature measured by the temperature measurer, the control device including: a period setting unit configured to set a cold start prevention period, which is a period for restricting an operation of a plasticizing member provided in the cylinder so as to be movable and rotatable, until a temperature of the molding material or the temperature of the mold rises, in which the period setting unit stores temperature-time data in which the temperature measured by the temperature measurer is associated with time, and sets the cold start prevention period based on an actual temperature of the stored temperature-time data.

BRIEF DESCRIPTION OF THE DRAWINGS

FIG. 7 is a diagram showing a decision table of a trigger condition in a heater selection control.

DETAILED DESCRIPTION

Figure 1:
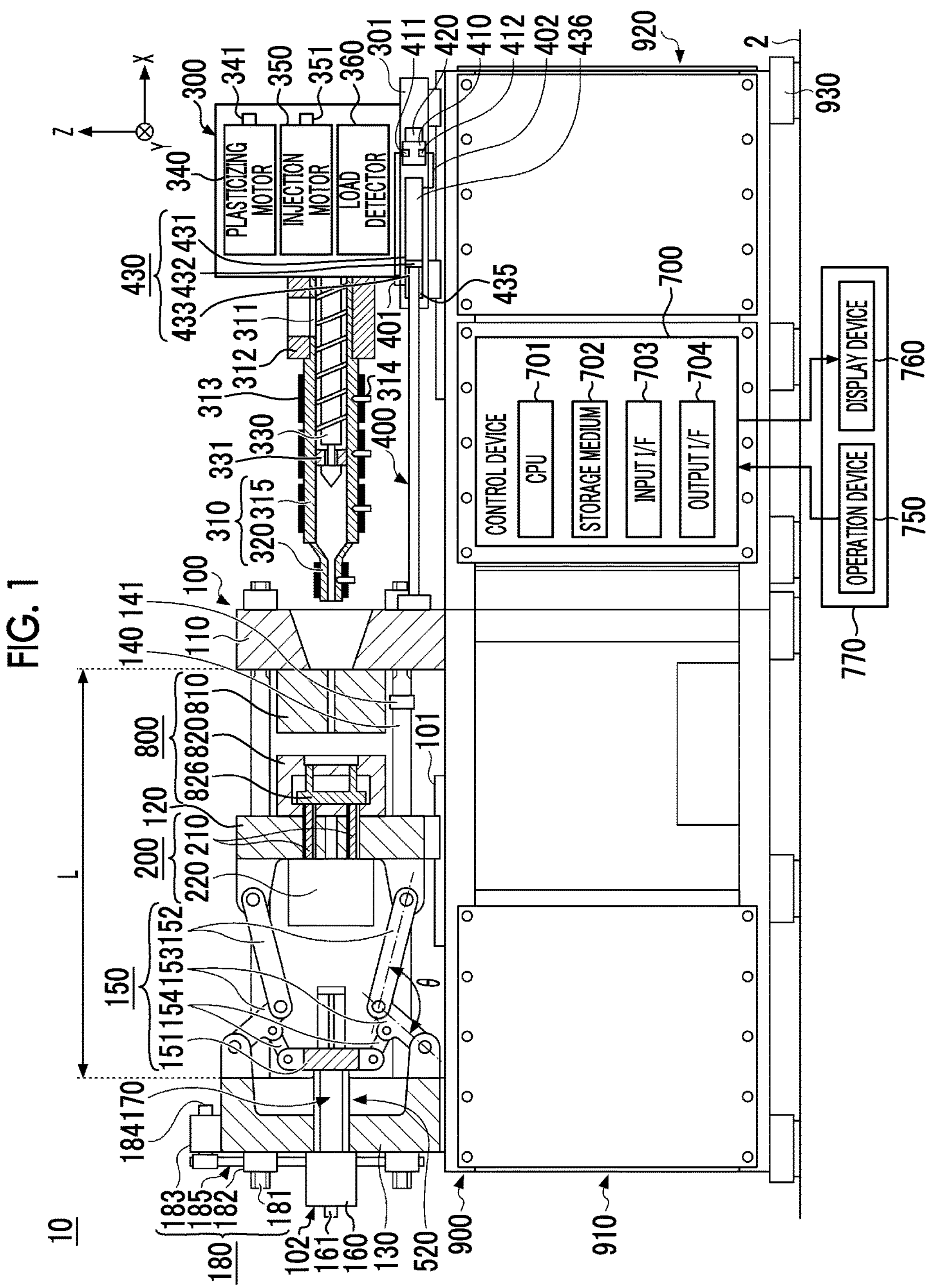
FIG. 1 is a view showing a state when mold opening is completed in an injection molding machine according to an embodiment.

However, as in the related art, in a case of control according to the kind of resin, a complicated calculation program has to be prepared in accordance with resin characteristics, and a special electrical component for executing the calculation program is required. Furthermore, resin information (for example, shear force, viscosity, or pvT properties) needs to be input before the operation of the injection molding machine, resulting in an increase in a workload on an operator. In particular, depending on the injection molding machine, the operator is required to input the resin information whenever the resin is changed, which imposes a great workload on the operator.

According to an embodiment of the present invention, there is provided a technique capable of easily and appropriately adjusting a cold start prevention period for restricting an operation of a plasticizing member.

Hereinafter, embodiments for carrying out the present disclosure will be described with reference to the drawings. In each drawing, there are cases where like elements are designated by like reference numerals, and overlapping descriptions may be omitted.

Injection Molding Machine

Figure 2:
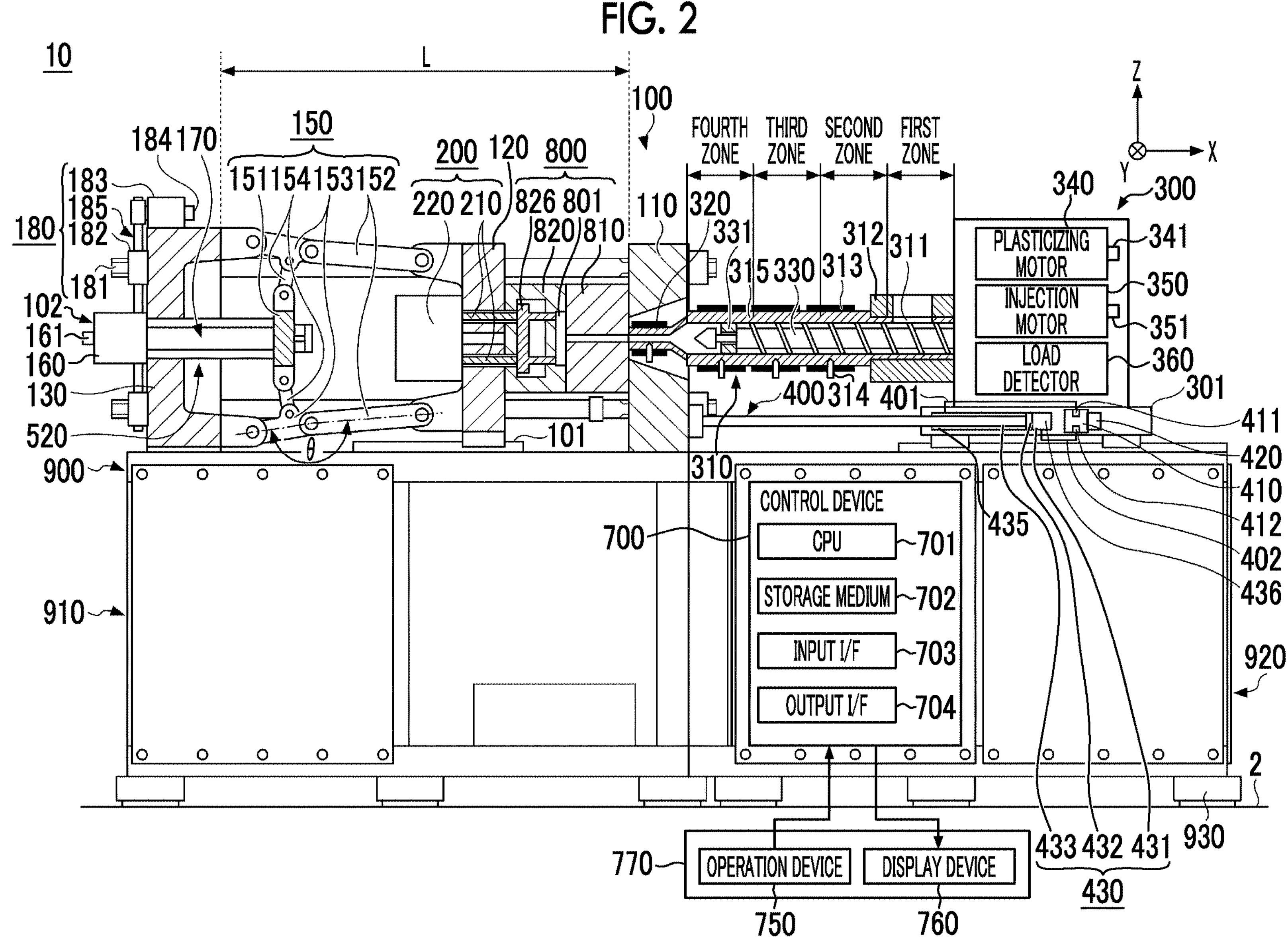
FIG. 2 is a view showing a state when mold clamping is performed in the injection molding machine according to the embodiment.

FIG. 1 is a view showing a state when mold opening is completed in an injection molding machine according to an embodiment. FIG. 2 is a view showing a state when mold clamping is performed in the injection molding machine according to the embodiment. In the present specification, an X-axis direction, a Y-axis direction, and a Z-axis direction are perpendicular to each other. The X-axis direction and the Y-axis direction represent a horizontal direction, and the Z-axis direction represents a vertical direction. In a case where a mold clamping unit 100 is of a horizontal type, the X-axis direction represents a mold opening and closing direction, and the Y-axis direction represents a width direction of an injection molding machine 10. A negative side in the Y-axis direction will be referred to as an operation side, and a positive side in the Y-axis direction will be referred to as a counter operation side.

As shown in FIGS. 1 and 2, the injection molding machine 10 includes the mold clamping unit 100 that opens and closes a mold unit 800, an ejector unit 200 that ejects a molding product molded by the mold unit 800, an injection unit 300 that injects a molding material into the mold unit 800, a moving unit 400 that causes the injection unit 300 to advance and retreat with respect to the mold unit 800, a control device 700 that controls each component of the injection molding machine 10, and a frame 900 that supports each component of the injection molding machine 10. The frame 900 includes a mold clamping unit frame 910 that supports the mold clamping unit 100, and an injection unit frame 920 that supports the injection unit 300. The mold clamping unit frame 910 and the injection unit frame 920 are respectively installed on a floor 2 via a leveling adjuster 930. The control device 700 is disposed in an internal space of the injection unit frame 920. Hereinafter, each component of the injection molding machine 10 will be described.

Mold Clamping Unit

In describing the mold clamping unit 100, a moving direction of a movable platen 120 during mold closing (for example, a positive direction of an X-axis) will be defined as forward, and a moving direction of the movable platen 120 during mold opening (for example, a negative direction of the X-axis) will be defined as rearward.

The mold clamping unit 100 performs mold closing, pressurizing, mold clamping, depressurizing, and mold opening of the mold unit 800. The mold unit 800 includes a stationary mold 810 and a movable mold 820.

For example, the mold clamping unit 100 is of a horizontal type, and the mold opening and closing direction is a horizontal direction. The mold clamping unit 100 includes a stationary platen 110 to which the stationary mold 810 is attached, the movable platen 120 to which the movable mold 820 is attached, and a moving mechanism 102 that moves the movable platen 120 in the mold opening and closing direction with respect to the stationary platen 110.

The stationary platen 110 is fixed to the mold clamping unit frame 910. The stationary mold 810 is attached to a surface of the stationary platen 110 facing the movable platen 120.

The movable platen 120 is disposed to be movable in the mold opening and closing direction with respect to the mold clamping unit frame 910. A guide 101 that guides the movable platen 120 is laid on the mold clamping unit frame 910. The movable mold 820 is attached to a surface of the movable platen 120 facing the stationary platen 110.

The moving mechanism 102 causes the movable platen 120 to advance and retreat with respect to the stationary platen 110 such that mold closing, pressurizing, mold clamping, depressurizing, and mold opening of the mold unit 800 are performed. The moving mechanism 102 includes a toggle support 130 disposed at an interval from the stationary platen 110, a tie bar 140 that connects the stationary platen 110 and the toggle support 130 to each other, a toggle mechanism 150 that moves the movable platen 120 in the mold opening and closing direction with respect to the toggle support 130, a mold clamping motor 160 that operates the toggle mechanism 150, a motion conversion mechanism 170 that converts a rotary motion into a linear motion of the mold clamping motor 160, and a mold space adjustment mechanism 180 that adjusts an interval between the stationary platen 110 and the toggle support 130.

The toggle support 130 is disposed at an interval from the stationary platen 110, and is placed on the mold clamping unit frame 910 to be movable in the mold opening and closing direction. The toggle support 130 may be disposed to be movable along a guide laid on the mold clamping unit frame 910. The guide of the toggle support 130 may be common to the guide of 101 of the movable platen 120.

In the present embodiment, the stationary platen 110 is fixed to the mold clamping unit frame 910, and the toggle support 130 is disposed to be movable in the mold opening and closing direction with respect to the mold clamping unit frame 910. However, the toggle support 130 may be fixed to the mold clamping unit frame 910, and the stationary platen 110 may be disposed to be movable in the mold opening and closing direction with respect to the mold clamping unit frame 910.

The tie bar 140 connects the stationary platen 110 and the toggle support 130 to each other at an interval L in the mold opening and closing direction. A plurality of (for example, four) tie bars 140 may be used. The plurality of tie bars 140 are disposed parallel to each other in the mold opening and closing direction, and extend in accordance with a mold clamping force. At least one of the tie bars 140 may be provided with a tie bar strain detector 141 that measures a strain of the tie bar 140. The tie bar strain detector 141 transmits a signal indicating a measurement result thereof to the control device 700. The measurement result of the tie bar strain detector 141 is used in measuring the mold clamping force or the like.

In the present embodiment, as a mold clamping force detector for measuring the mold clamping force, the tie bar strain detector 141 is used. However, the present invention is not limited thereto. The mold clamping force detector is not limited to a strain gauge type. The mold clamping force detector may be of a piezoelectric type, a capacitive type, a hydraulic type, an electromagnetic type, or the like, and an attachment position thereof is not limited to the tie bar 140.

The toggle mechanism 150 is disposed between the movable platen 120 and the toggle support 130, and moves the movable platen 120 in the mold opening and closing direction with respect to the toggle support 130. The toggle mechanism 150 has a crosshead 151 that moves in the mold opening and closing direction, and a pair of link groups bent and stretched by a movement of the crosshead 151. Each of the pair of link groups has a first link 152 and a second link 153 which are connected to be freely bent and stretched by a pin or the like. The first link 152 is oscillatingly attached to the movable platen 120 by a pin or the like. The second link 153 is oscillatingly attached to the toggle support 130 by a pin or the like. The second link 153 is attached to the crosshead 151 via a third link 154. When the crosshead 151 is caused to advance and retreat with respect to the toggle support 130, the first link 152 and the second link 153 are bent and stretched, and the movable platen 120 advances and retreats with respect to the toggle support 130.

A configuration of the toggle mechanism 150 is not limited to configurations shown in FIGS. 1 and 2. For example, in FIGS. 1 and 2, the number of nodes in each link group is five, but may be four. One end portion of the third link 154 may be connected to the node between the first link 152 and the second link 153.

The mold clamping motor 160 is attached to the toggle support 130, and operates the toggle mechanism 150. The mold clamping motor 160 causes the crosshead 151 to advance and retreat with respect to the toggle support 130 such that the first link 152 and the second link 153 are bent and stretched and the movable platen 120 advances and retreats with respect to the toggle support 130. The mold clamping motor 160 is directly connected to the motion conversion mechanism 170, but may be connected to the motion conversion mechanism 170 via a belt, a pulley, or the like.

The motion conversion mechanism 170 converts a rotary motion of the mold clamping motor 160 into a linear motion of the crosshead 151. The motion conversion mechanism 170 includes a screw shaft and a screw nut screwed to the screw shaft. A ball or a roller may be interposed between the screw shaft and the screw nut.

The mold clamping unit 100 performs a mold closing process, a pressurizing process, a mold clamping process, a depressurizing process, a mold opening process, and the like under the control of the control device 700.

In the mold closing process, the mold clamping motor 160 is driven to cause the crosshead 151 to advance to a mold closing completion position at a set movement speed, thereby causing the movable platen 120 to advance such that the movable mold 820 touches the stationary mold 810. For example, a position or a movement speed of the crosshead 151 is measured by using a mold clamping motor encoder 161. The mold clamping motor encoder 161 measures rotation of the mold clamping motor 160, and transmits a signal indicating a measurement result thereof to the control device 700.

A crosshead position detector for measuring a position of the crosshead 151 and a crosshead movement speed detector for measuring a movement speed of the crosshead 151 are not limited to the mold clamping motor encoder 161, and a general detector can be used. In addition, a movable platen position detector for measuring a position of the movable platen 120 and a movable platen movement speed detector for measuring a movement speed of the movable platen 120 are not limited to the mold clamping motor encoder 161, and a general detector can be used.

In the pressurizing process, the mold clamping motor 160 is further driven to cause the crosshead 151 to further advance from the mold closing completion position to a mold clamping position, thereby generating a mold clamping force.

In the mold clamping process, the mold clamping motor 160 is driven to maintain the position of the crosshead 151 at the mold clamping position. In the mold clamping process, the mold clamping force generated in the pressurizing process is maintained. In the mold clamping process, a cavity space 801 (refer to FIG. 2) is formed between the movable mold 820 and the stationary mold 810, and the injection unit 300 fills the cavity space 801 with a liquid molding material. A molding product is obtained by solidifying the molding material filled therein.

The number of the cavity spaces 801 may be one or more. In the latter case, a plurality of the molding products can be obtained at the same time. An insert material may be disposed in a portion of the cavity space 801, and the other portion of the cavity space 801 may be filled with the molding material. A molding product in which the insert material and the molding material are integrated with each other can be obtained.

In the depressurizing process, the mold clamping motor 160 is driven to cause the crosshead 151 to retreat from the mold clamping position to a mold opening start position such that the movable platen 120 retreats to reduce the mold clamping force. The mold opening start position and the mold closing completion position may be the same position.

In the mold opening process, the mold clamping motor 160 is driven to cause the crosshead 151 to retreat from the mold opening start position to a mold opening completion position at a set movement speed such that the movable platen 120 retreats and the movable mold 820 is separated from the stationary mold 810. Thereafter, the ejector unit 200 ejects the molding product from the movable mold 820.

Setting conditions in the mold closing process, the pressurizing process, and the mold clamping process are collectively set as a series of setting conditions. For example, the movement speed or positions (including a mold closing start position, a movement speed switching position, the mold closing completion position, and the mold clamping position) of the crosshead 151 and the mold clamping force in the mold closing process and in the pressurizing process are collectively set as a series of setting conditions. The mold closing start position, the movement speed switching position, the mold closing completion position, and the mold clamping position are aligned in this order from a rear side toward a front side, and represent a start point and an end point of a section in which the movement speed is set. The movement speed is set for each section. The number of the movement speed switching positions may be one or more. The movement speed switching position may not be set. Only one of the mold clamping position and the mold clamping force may be set.

The setting conditions in the depressurizing process and in the mold opening process are set in the same manner. For example, the movement speed or positions (the mold opening start position, the movement speed switching position, and the mold opening completion position) of the crosshead 151 in the depressurizing process and in the mold opening process are collectively set as a series of setting conditions. The mold opening start position, the movement speed switching position, and the mold opening completion position are aligned in this order from the front side toward the rear side, and represent the start point and the end point of the section in which the movement speed is set. The movement speed is set for each section. The number of the movement speed switching positions may be one or more. The movement speed switching position may not be set. The mold opening start position and the mold closing completion position may be the same position. In addition, the mold opening completion position and the mold closing start position may be the same position.

Instead of the movement speed, positions, and the like of the crosshead 151, the movement speed, positions, and the like of the movable platen 120 may be set. In addition, instead of the position (for example, the mold clamping position) of the crosshead or the position of the movable platen, the mold clamping force may be set.

The toggle mechanism 150 amplifies a driving force of the mold clamping motor 160, and transmits the driving force to the movable platen 120. An amplification magnification is referred to as a toggle magnification. The toggle magnification is changed according to an angle θ (hereinafter, also referred to as a "link angle θ") formed between the first link 152 and the second link 153. The link angle θ is obtained from the position of the crosshead 151. When the link angle θ is 180°, the toggle magnification is maximized.

In a case where a mold space of the mold unit 800 is changed due to replacement of the mold unit 800, a temperature change in the mold unit 800, or the like, mold space adjustment is performed so that a predetermined mold clamping force is obtained during the mold clamping. For example, in the mold space adjustment, the interval L between the stationary platen 110 and the toggle support 130 is adjusted so that the link angle θ of the toggle mechanism 150 becomes a predetermined angle at a mold touch time at which the movable mold 820 touches the stationary mold 810.

The mold clamping unit 100 has the mold space adjustment mechanism 180. The mold space adjustment mechanism 180 performs the mold space adjustment by adjusting the interval L between the stationary platen 110 and the toggle support 130. For example, a time for the mold space adjustment is determined from an end point of a molding cycle to a start point of a subsequent molding cycle. For example, the mold space adjustment mechanism 180 has a screw shaft 181 formed in a rear end portion of the tie bar 140, a screw nut 182 held by the toggle support 130 to be rotatable and not to advance and retreat, and a mold space adjustment motor 183 that rotates the screw nut 182 screwed to the screw shaft 181.

The screw shaft 181 and the screw nut 182 are provided for each of the tie bars 140. A rotational driving force of the mold space adjustment motor 183 may be transmitted to a plurality of the screw nuts 182 via a rotational driving force transmitting unit 185. The plurality of screw nuts 182 can be rotated in synchronization with each other. The plurality of screw nuts 182 can be individually rotated by changing a transmission channel of the rotational driving force transmitting unit 185.

For example, the rotational driving force transmitting unit 185 is configured to include a gear. In this case, a driven gear is formed on an outer periphery of each screw nut 182, a driving gear is attached to an output shaft of the mold space adjustment motor 183, and a plurality of intermediate gears meshing with the driven gear and the driving gear are held to be rotatable in a central portion of the toggle support 130. The rotational driving force transmitting unit 185 may be configured to include a belt, a pulley, or the like instead of the gear.

An operation of the mold space adjustment mechanism 180 is controlled by the control device 700. The control device 700 drives the mold space adjustment motor 183 to rotate the screw nut 182. As a result, a position of the toggle support 130 with respect to the tie bar 140 is adjusted, and the interval L between the stationary platen 110 and the toggle support 130 is adjusted. In addition, a plurality of the mold space adjustment mechanisms may be used in combination.

The interval L is measured by using a mold space adjustment motor encoder 184. The mold space adjustment motor encoder 184 measures a rotation amount or a rotation direction of the mold space adjustment motor 183, and transmits a signal indicating a measurement result thereof to the control device 700. The measurement result of the mold space adjustment motor encoder 184 is used in monitoring or controlling the position or the interval L of the toggle support 130. A toggle support position detector for measuring the position of the toggle support 130 and an interval detector for measuring the interval L are not limited to the mold space adjustment motor encoder 184, and a general detector can be used.

The mold clamping unit 100 may include a mold temperature controller that adjusts the temperature of the mold unit 800. The mold unit 800 internally has a flow path of a temperature control medium. The mold temperature controller adjusts the temperature of the mold unit 800 by adjusting a temperature of the temperature control medium supplied to the flow path of the mold unit 800.

The mold clamping unit 100 of the present embodiment is of the horizontal type in which the mold opening and closing direction is the horizontal direction, but may be of a vertical type in which the mold opening and closing direction is an upward-downward direction.

The mold clamping unit 100 of the present embodiment has the mold clamping motor 160 as a drive unit. However, a hydraulic cylinder may be provided instead of the mold clamping motor 160. In addition, the mold clamping unit 100 may have a linear motor for mold opening and closing, and may have an electromagnet for mold clamping.

Ejector Unit

In describing the ejector unit 200, similarly to the description of the mold clamping unit 100, a moving direction of the movable platen 120 during the mold closing (for example, the positive direction of the X-axis) will be defined as forward, and a moving direction of the movable platen 120 during the mold opening (for example, the negative direction of the X-axis) will be defined as rearward.

The ejector unit 200 is attached to the movable platen 120, and advances and retreats together with the movable platen 120. The ejector unit 200 has an ejector rod 210 that ejects a molding product from the mold unit 800, and a drive mechanism 220 that moves the ejector rod 210 in the moving direction (X-axis direction) of the movable platen 120.

The ejector rod 210 is disposed to be able to advance and retreat in a through-hole of the movable platen 120. A front end portion of the ejector rod 210 comes into contact with an ejector plate 826 of the movable mold 820. The front end portion of the ejector rod 210 may be connected to or may not be connected to the ejector plate 826.

For example, the drive mechanism 220 has an ejector motor and a motion conversion mechanism that converts a rotary motion of the ejector motor into a linear motion of the ejector rod 210. The motion conversion mechanism includes a screw shaft and a screw nut screwed to the screw shaft. A ball or a roller may be interposed between the screw shaft and the screw nut.

The ejector unit 200 performs an ejection process under the control of the control device 700. In the ejection process, the ejector rod 210 is caused to advance from a standby position to an ejection position at a set movement speed such that the ejector plate 826 advances to eject the molding product. Thereafter, the ejector motor is driven to cause the ejector rod 210 to retreat at a set movement speed such that the ejector plate 826 retreats to an original standby position.

For example, a position or a movement speed of the ejector rod 210 is measured by using an ejector motor encoder. The ejector motor encoder measures the rotation of the ejector motor, and transmits a signal indicating a measurement result thereof to the control device 700. An ejector rod position detector for measuring the position of the ejector rod 210 and an ejector rod movement speed detector for measuring the movement speed of the ejector rod 210 are not limited to the ejector motor encoder, and a general detector can be used.

Injection Unit

In describing the injection unit 300, unlike the description of the mold clamping unit 100 or the description of the ejector unit 200, a moving direction of a screw 330 during filling (for example, the negative direction of the X-axis) will be defined as forward, and a moving direction of the screw 330 during plasticizing (for example, the positive direction of the X-axis) will be defined as rearward.

The injection unit 300 is installed on a slide base 301, and the slide base 301 is disposed to be able to advance and retreat with respect to the injection unit frame 920. The injection unit 300 is disposed to be able to advance and retreat with respect to the mold unit 800. The injection unit 300 touches the mold unit 800, and fills the cavity space 801 inside the mold unit 800 with the molding material. For example, the injection unit 300 has a cylinder 310 that heats the molding material, the screw 330 that is disposed to be able to advance and retreat and to rotate inside the cylinder 310, a plasticizing motor 340 that rotates the screw 330, an injection motor 350 that causes the screw 330 to advance and retreat, and a load detector 360 that measures a load transmitted between the injection motor 350 and the screw 330.

The cylinder 310 includes a cylindrical cylinder body 315 and a funnel-shaped nozzle 320 provided at a front end portion of the cylinder body 315. The cylinder body 315 heats the molding material supplied into the cylinder body 315 from a feed port 311. For example, the molding material includes a resin. For example, the molding material is formed in a pellet shape, and is supplied to the feed port 311 in a solid state. The feed port 311 is formed in a rear portion of the cylinder body 315. A cooler 312 such as a water-cooling cylinder is provided on an outer periphery of the rear portion of the cylinder body 315. The nozzle 320 forms a portion that is pressed against the mold unit 800 to fill the mold unit 800 with the molding material.

In addition, in the injection molding machine 10 according to the present embodiment, a plurality of zones are set in order to independently control the heating of the cylinder 310 along an axial direction (X-axis direction) of the cylinder 310. For example, as the plurality of zones, a first zone, a second zone, a third zone, and a fourth zone are set in this order from the rear side toward the front side in the cylinder body 315. The fourth zone is the front end portion of the cylinder body 315.

The cylinder 310 includes a heating unit 313 (temperature control mechanism) and a temperature measurer 314 for each of the plurality of zones. Each of the heating units 313 and the temperature measurers 314 is provided so as to be in contact with an outer peripheral surface of the cylinder 310 (or at a position in the vicinity thereof separated from the outer peripheral surface). For example, as the heating unit 313, a heater such as a band heater that surrounds the outer peripheral surface of the cylinder 310 can be applied. The control device 700 controls each of the heating units 313 provided for the corresponding zones to adjust a temperature in the axial direction of the cylinder 310. Regarding the control, the control device 700 controls each of the heating units 313 so that a temperature of each of the temperature measurers 314 becomes a set temperature set for the corresponding zone.

The screw 330 is disposed to be able to rotate and to advance and retreat inside the cylinder 310. When the screw 330 is rotated, the molding material is fed forward along a helical groove of the screw 330. The molding material is gradually melted by heat from the cylinder 310 while being fed forward. As the liquid molding material is fed forward of the screw 330 and is accumulated in a front portion of the cylinder 310, the screw 330 retreats. Thereafter, when the screw 330 is caused to advance, the liquid molding material accumulated in front of the screw 330 is injected from the nozzle 320, and fills an inside of the mold unit 800.

As a backflow prevention valve for preventing a backflow of the molding material fed rearward from the front of the screw 330 when the screw 330 is pressed forward, a backflow prevention ring 331 is attached to a front portion of the screw 330 to be able to advance and retreat.

The backflow prevention ring 331 is pressed rearward by a pressure of the molding material in front of the screw 330 when the screw 330 is caused to advance, and retreats relative to the screw 330 to a close position (refer to FIG. 2) at which a flow path of the molding material is closed. Accordingly, the molding material accumulated in front of the screw 330 is prevented from flowing rearward.

On the other hand, the backflow prevention ring 331 is pressed forward by the pressure of the molding material fed forward along the helical groove of the screw 330 when the screw 330 is rotated, and advances relative to the screw 330 to an open position (refer to FIG. 1) at which the flow path of the molding material is open. Accordingly, the molding material is fed forward of the screw 330.

The backflow prevention ring 331 may be of either a co-rotation type rotating together with the screw 330 or a non-co-rotation type that does not rotate together with the screw 330.

The injection unit 300 may have a drive source that causes the backflow prevention ring 331 to advance and retreat with respect to the screw 330 between the open position and the close position.

The plasticizing motor 340 rotates the screw 330. The drive source for rotating the screw 330 is not limited to the plasticizing motor 340, and may be a hydraulic pump, for example.

The injection motor 350 is an injection drive source that causes the screw 330 to advance and retreat. A motion conversion mechanism that converts a rotary motion of the injection motor 350 into a linear motion of the screw 330 or the like is provided between the injection motor 350 and the screw 330. For example, the motion conversion mechanism has a screw shaft and a screw nut screwed to the screw shaft. A ball, a roller, or the like may be provided between the screw shaft and the screw nut. A drive source that causes the screw 330 to advance and retreat is not limited to the injection motor 350, and may be a hydraulic cylinder, for example.

The load detector 360 measures a load transmitted between the injection motor 350 and the screw 330. The measured load is converted into a pressure by the control device 700. The load detector 360 is provided in a load transmission channel between the injection motor 350 and the screw 330, and measures the load acting on the load detector 360.

The load detector 360 transmits a signal of the measured load to the control device 700. The load measured by the load detector 360 is converted into the pressure acting between the screw 330 and the molding material, and is used in controlling or monitoring the pressure received from the molding material by the screw 330, a back pressure against the screw 330, the pressure acting on the molding material from the screw 330, or the like.

A pressure detector for measuring the pressure of the molding material is not limited to the load detector 360, and a general detector can be used. For example, a nozzle pressure sensor or a mold internal pressure sensor may be used. The nozzle pressure sensor is installed in the nozzle 320. The mold internal pressure sensor is installed inside the mold unit 800.

The injection unit 300 performs a plasticizing process, a filling process, a holding pressure process, and the like under the control of the control device 700. The filling process and the holding pressure process may be collectively referred to as an injection process.

In the plasticizing process, the plasticizing motor 340 is driven to rotate the screw 330 at a set rotational speed such that the molding material is fed forward along the helical groove of the screw 330. As a result, the molding material is gradually melted. As the liquid molding material is fed forward of the screw 330 and is accumulated in a front portion of the cylinder 310, the screw 330 retreats. For example, the rotational speed of the screw 330 is measured by using a plasticizing motor encoder 341. The plasticizing motor encoder 341 measures the rotation of the plasticizing motor 340, and transmits a signal indicating a measurement result thereof to the control device 700. A screw rotational speed detector for measuring the rotational speed of the screw 330 is not limited to the plasticizing motor encoder 341, and a general detector can be used.

In the plasticizing process, the injection motor 350 may be driven to apply a set back pressure to the screw 330 in order to limit a sudden retreat of the screw 330. The back pressure applied to the screw 330 is measured by using the load detector 360, for example. When the screw 330 retreats to a plasticizing completion position and a predetermined amount of the molding material is accumulated in front of the screw 330, the plasticizing process is completed.

The position and the rotational speed of the screw 330 in the plasticizing process are collectively set as a series of setting conditions. For example, a plasticizing start position, a rotational speed switching position, and the plasticizing completion position are set. These positions are aligned in this order from the front side toward the rear side, and represent a start point and an end point of a section in which the rotational speed is set. The rotational speed is set for each section. The number of the rotational speed switching positions may be one or more. The rotational speed switching position may not be set. In addition, the back pressure is set for each section.

In the filling process, the injection motor 350 is driven to cause the screw 330 to advance at a set movement speed, and the cavity space 801 inside the mold unit 800 is filled with the liquid molding material accumulated in front of the screw 330. The position or the movement speed of the screw 330 is measured by using an injection motor encoder 351, for example. The injection motor encoder 351 measures the rotation of the injection motor 350, and transmits a signal indicating a measurement result thereof to the control device 700. When the position of the screw 330 reaches a set position, the filling process is switched to the holding pressure process (so-called V/P switching). The position where the V/P switching is performed will be referred to as a V/P switching position. The set movement speed of the screw 330 may be changed in accordance with the position, a time, or the like of the screw 330.

The position and the movement speed of the screw 330 in the filling process are collectively set as a series of setting conditions. For example, a filling start position (also referred to as an "injection start position"), the movement speed switching position, and the V/P switching position are set. These positions are aligned in this order from the rear side toward the front side, and represent the start point and the end point of the section in which the movement speed is set. The movement speed is set for each section. The number of the movement speed switching positions may be one or more. The movement speed switching position may not be set.

An upper limit of the pressure of the screw 330 is set for each section in which the movement speed of the screw 330 is set. The pressure of the screw 330 is measured by the load detector 360. In a case where the pressure of the screw 330 is equal to or lower than a setting pressure, the screw 330 advances at a set movement speed. On the other hand, in a case where the pressure of the screw 330 exceeds the setting pressure, in order to protect the mold, the screw 330 is caused to advance at a movement speed slower than the set movement speed so that the pressure of the screw 330 is equal to or lower than the setting pressure.

After the position of the screw 330 reaches the V/P switching position in the filling process, the screw 330 may be temporarily stopped at the V/P switching position, and thereafter, the V/P switching may be performed. Immediately before the V/P switching, instead of stopping the screw 330, the screw 330 may be caused to advance at a low speed, or may be caused to retreat at a low speed. In addition, a screw position detector for measuring the position of the screw 330 and a screw movement speed detector for measuring the movement speed of the screw 330 are not limited to the injection motor encoder 351, and a general detector can be used.

In the holding pressure process, the injection motor 350 is driven to press the screw 330 forward. A pressure (hereinafter, also referred to as a "holding pressure") of the molding material in a front end portion of the screw 330 is held at a set pressure, and the molding material remaining inside the cylinder 310 is pressed toward the mold unit 800. An insufficient amount of the molding material due to cooling shrinkage inside the mold unit 800 can be replenished. The holding pressure is measured by using the load detector 360, for example. A set value of the holding pressure may be changed depending on an elapsed time from the start of the holding pressure process or the like. A plurality of holding pressures and a plurality of holding times for holding the holding pressures in the holding pressure process may be respectively set, or may be collectively set as a series of setting conditions.

In the holding pressure process, the molding material in the cavity space 801 inside the mold unit 800 is gradually cooled, and when the holding pressure process is completed, an inlet of the cavity space 801 is closed by the solidified molding material. This state is referred to as gate seal, and prevents the backflow of the molding material from the cavity space 801. After the holding pressure process, a cooling process starts. In the cooling process, the molding material inside the cavity space 801 is solidified. In order to shorten a molding cycle time, the plasticizing process may be performed during the cooling process.

The injection unit 300 of the present embodiment is of an in-line screw type, but may be of a pre-plasticizing type. A pre-plasticizing type injection unit supplies the molding material melted inside a plasticizing cylinder to an injection cylinder, and the molding material is injected into the mold unit from the injection cylinder. Inside the plasticizing cylinder, the screw is disposed to be rotatable and not to be able to advance and retreat, or the screw is disposed to be rotatable and to be able to advance and retreat. On the other hand, a plunger is disposed to be able to advance and retreat inside the injection cylinder.

In addition, the injection unit 300 of the present embodiment is of a horizontal type in which the axial direction of the cylinder 310 is a horizontal direction, but may be of a vertical type in which the axial direction of the cylinder 310 is an upward-downward direction. The mold clamping unit combined with a vertical type injection unit 300 may be of the vertical type or the horizontal type. Similarly, the mold clamping unit combined with a horizontal type injection unit 300 may be of the horizontal type or the vertical type.

Moving Unit

In describing the moving unit 400, similarly to the description of the injection unit 300, a moving direction of the screw 330 during the filling (for example, the negative direction of the X-axis) will be defined as forward, and a moving direction of the screw 330 during the plasticizing (for example, the positive direction of the X-axis) will be defined as rearward.

The moving unit 400 causes the injection unit 300 to advance and retreat with respect to the mold unit 800. The moving unit 400 presses the nozzle 320 against the mold unit 800, thereby generating a nozzle touch pressure. The moving unit 400 includes a hydraulic pump 410, a motor 420 serving as a drive source, a hydraulic cylinder 430 serving as a hydraulic actuator, and the like.

The hydraulic pump 410 has a first port 411 and a second port 412. The hydraulic pump 410 is a pump that can rotate in both directions, and switches rotation directions of the motor 420 such that a hydraulic fluid (for example, oil) is suctioned from any one of the first port 411 and the second port 412, and is discharged from the other to generate a hydraulic pressure. The hydraulic pump 410 can suction the hydraulic fluid from a tank, and can discharge the hydraulic fluid from any one of the first port 411 and the second port 412.

The motor 420 operates the hydraulic pump 410. The motor 420 drives the hydraulic pump 410 in a rotation direction and with a rotation torque in accordance with a control signal transmitted from the control device 700. The motor 420 may be an electric motor, or may be an electric servo motor.

The hydraulic cylinder 430 has a cylinder body 431, a piston 432, and a piston rod 433. The cylinder body 431 is fixed to the injection unit 300. The piston 432 partitions the inside of the cylinder body 431 into a front chamber 435 serving as a first chamber and into a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow path 401. The hydraulic fluid discharged from the first port 411 is supplied to the front chamber 435 via the first flow path 401, whereby the injection unit 300 is pressed forward. The injection unit 300 advances, and the nozzle 320 is pressed against the stationary mold 810. The front chamber 435 functions as a pressure chamber that generates the nozzle touch pressure of the nozzle 320 by means of the pressure of the hydraulic fluid supplied from the hydraulic pump 410.

On the other hand, the rear chamber 436 of the hydraulic cylinder 430 is connected to the second port 412 of the hydraulic pump 410 via a second flow path 402. The hydraulic fluid discharged from the second port 412 is supplied to the rear chamber 436 of the hydraulic cylinder 430 via the second flow path 402, whereby the injection unit 300 is pressed rearward. The injection unit 300 retreats, and the nozzle 320 is separated from the stationary mold 810.

In the present embodiment, the moving unit 400 includes the hydraulic cylinder 430, but the present invention is not limited thereto. For example, instead of the hydraulic cylinder 430, an electric motor and a motion conversion mechanism that converts a rotary motion of the electric motor into a linear motion of the injection unit 300 may be used.

Control Device

For example, the control device 700 is configured to include a computer, and has a central processing unit (CPU) 701, a storage medium 702 such as a memory, an input interface 703, and an output interface 704 as shown in FIGS. 1 and 2. The control device 700 performs various kinds of control by causing the CPU 701 to execute a program stored in the storage medium 702. In addition, the control device 700 receives a signal from the outside through the input interface 703, and transmits the signal to the outside through the output interface 704.

The control device 700 repeatedly performs the plasticizing process, the mold closing process, the pressurizing process, the mold clamping process, the filling process, the holding pressure process, the cooling process, the depressurizing process, the mold opening process, the ejection process, and the like, thereby repeatedly manufacturing the molding product. A series of operations for obtaining the molding product, for example, an operation from the start of the plasticizing process to the start of the subsequent plasticizing process, will be referred to as a "shot" or a "molding cycle". In addition, a time required for one shot will be referred to as a "molding cycle time" or a "cycle time".

For example, one molding cycle has the plasticizing process, the mold closing process, the pressurizing process, the mold clamping process, the filling process, the holding pressure process, the cooling process, the depressurizing process, the mold opening process, and the ejection process in this order. The order described here is the order of the start times of the respective processes. The filling process, the holding pressure process, and the cooling process are performed during the mold clamping process. The start of the mold clamping process may coincide with the start of the filling process. The completion of the depressurizing process coincides with the start of the mold opening process.

A plurality of processes may be performed at the same time in order to shorten the molding cycle time. For example, the plasticizing process may be performed during the cooling process of the previous molding cycle or may be performed during the mold clamping process. In this case, the mold closing process may be performed in an initial stage of the molding cycle. In addition, the filling process may start during the mold closing process. In addition, the ejection process may start during the mold opening process. In a case where an on-off valve for opening and closing the flow path of the nozzle 320 is provided, the mold opening process may start during the plasticizing process. The reason is as follows. Even when the mold opening process starts during the plasticizing process, when the on-off valve closes the flow path of the nozzle 320, the molding material does not leak from the nozzle 320.

One molding cycle may include a process other than the plasticizing process, the mold closing process, the pressurizing process, the mold clamping process, the filling process, the holding pressure process, the cooling process, the depressurizing process, the mold opening process, and the ejection process.

For example, after the holding pressure process is completed and before the plasticizing process starts, a pre-plasticizing suck-back process of causing the screw 330 to retreat to a preset plasticizing start position may be performed. The pressure of the molding material accumulated in front of the screw 330 before the plasticizing process starts can be reduced, and a sudden retreat of the screw 330 when the plasticizing process starts can be prevented.

Alternatively, after the plasticizing process is completed and before the filling process starts, a post-plasticizing suck-back process of causing the screw 330 to retreat to a preset filling start position may be performed. The pressure of the molding material accumulated in front of the screw 330 before the filling process starts can be reduced, and a leakage of the molding material from the nozzle 320 before the filling process starts can be prevented.

The control device 700 is connected to an operation device 750 that receives an input operation of a user, and to a display device 760 that displays a screen. For example, the operation device 750 and the display device 760 may be integrated with each other in a form of a touch panel 770. The touch panel 770 serving as the display device 760 displays the screen under the control of the control device 700. For example, the screen of the touch panel 770 may display settings of the injection molding machine 10, and information on a current state of the injection molding machine 10. In addition, for example, the screen of the touch panel 770 may display a button for accepting the input operation of the user or an operation portion such as an input field. The touch panel 770 serving as the operation device 750 detects an input operation of the user on the screen, and outputs a signal corresponding to the input operation to the control device 700. In this manner, for example, while confirming information displayed on the screen, the user can perform setting (including an input of a set value) of the injection molding machine 10 by operating the operation portion provided on the screen. In addition, the user can operate the injection molding machine 10 corresponding to the operation portion by operating the operation portion provided on the screen. For example, the operation of the injection molding machine 10 may be an operation (including stopping) of the mold clamping unit 100, the ejector unit 200, the injection unit 300, the moving unit 400, or the like. In addition, the operation of the injection molding machine 10 may be switching between the screens displayed on the touch panel 770 serving as the display device 760.

A case has been described in which the operation device 750 and the display device 760 of the present embodiment are integrated with each other as the touch panel 770. However, both of these may be independently provided. In addition, a plurality of the operation devices 750 may be provided. The operation device 750 and the display device 760 are disposed on the operation side (a negative direction of the Y-axis) of the mold clamping unit 100 (more specifically, the stationary platen 110).

Details of Control Device

Figure 3:
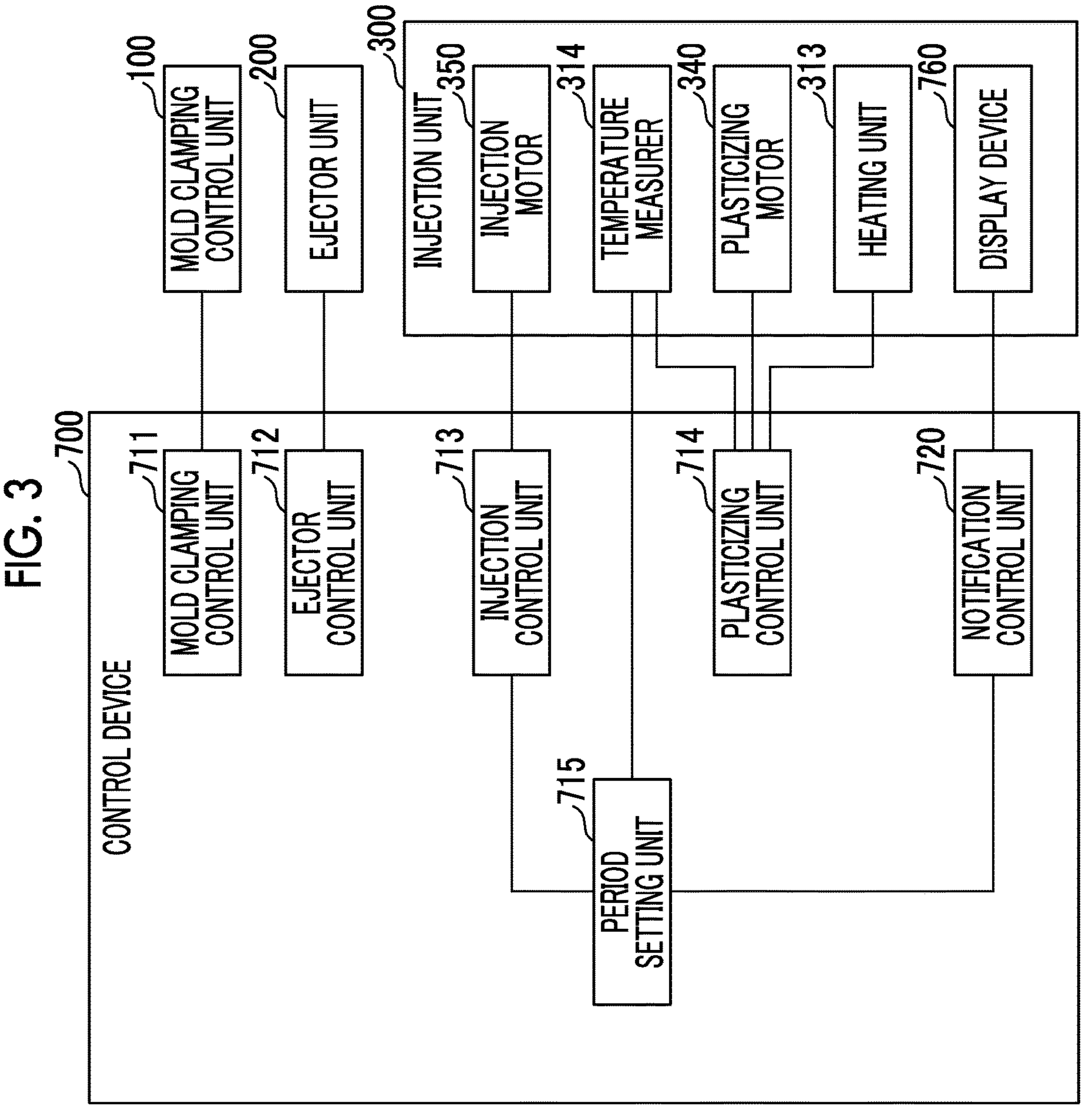
FIG. 3 is a functional block diagram showing an example of components of a control device.

Next, an example of components of the control device 700 will be described with reference to FIG. 3. Each functional block shown in FIG. 3 is conceptual, and may not necessarily be configured to be physical as shown. All or a portion of each functional block can be configured to be functionally or physically distributed and integrated in any desired unit. All or any desired portion of each processing function performed in each functional block may be realized by a program executed by a CPU, or may be realized as hardware using a wired logic.

As shown in FIG. 3, for example, the control device 700 includes a mold clamping control unit 711, an ejector control unit 712, an injection control unit 713, and a plasticizing control unit 714. The mold clamping control unit 711 controls the mold clamping unit 100 to perform the mold closing process, the pressurizing process, the mold clamping process, the depressurizing process, and the mold opening process shown in FIG. 4. The ejector control unit 712 controls the ejector unit 200 to perform the ejection process.

Figure 4:
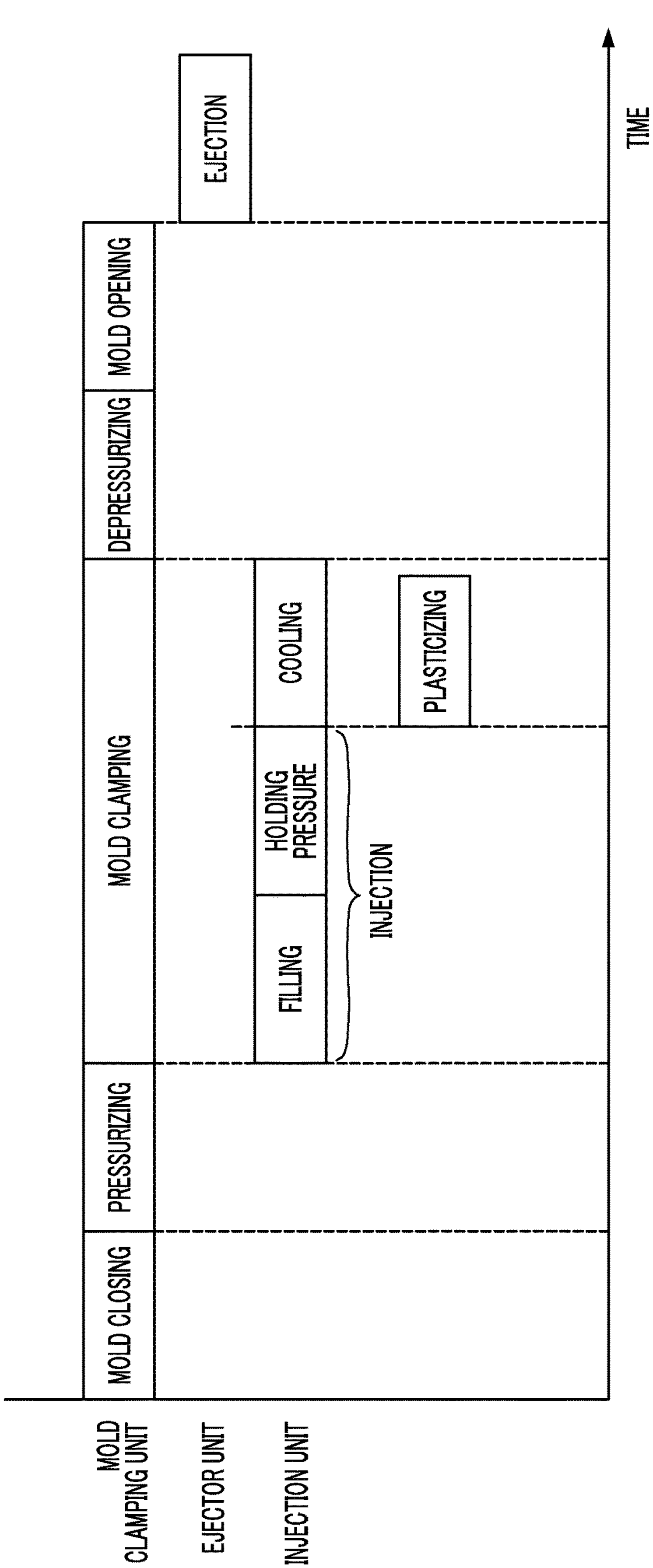
FIG. 4 is a diagram showing an example of processes of a molding cycle.

The injection control unit 713 controls the injection motor 350 of the injection unit 300 to perform the injection process and the cooling process. In addition, the injection process includes the filling process and the holding pressure process, and is performed during the mold clamping process in the present embodiment as shown in FIG. 4. The filling process is a process of controlling the injection motor 350 so that an actual value of a movement speed of an injection member provided inside the cylinder 310 becomes a set value. The filling process is a process of filling the inside of the mold unit 800 with the liquid molding material accumulated in front of the injection member by moving the injection member forward. The injection member is, for example, the screw 330 (see FIGS. 1 and 2), but may be a plunger.

The movement speed of the injection member in the filling process is measured by using the injection motor encoder 351. In the filling process, since the pressure acting on the molding material increases as the injection member moves forward, a process of temporarily stopping the injection member or a process of causing the injection member to retreat may be included immediately before the holding pressure process.

The holding pressure process is a process of replenishing a shortage of the molding material due to cooling shrinkage in the mold unit 800 by pressing the injection member forward. In the holding pressure process, the injection motor 350 is controlled so that an actual value of a filling pressure becomes a set value. The filling pressure is measured by using a pressure detector such as the load detector 360. As the pressure detector, a nozzle pressure sensor or a mold internal pressure sensor may be used.

Meanwhile, the plasticizing control unit 714 controls the plasticizing motor 340 of the injection unit 300 to perform the plasticizing process. In the present embodiment, the plasticizing process is performed during the cooling process. In addition, the plasticizing control unit 714 reads a set temperature of each zone of the cylinder 310 during the plasticizing process, and controls an operation of the heater (heating unit 313) based on the set temperature. Regarding heater control, the plasticizing control unit 714 maintains the set temperature by feeding back the temperature measured by each temperature measurer 314.

Cold Start Prevention Control

Next, a cold start prevention control performed by the injection molding machine 10 will be described. After the machine is started, the injection molding machine 10 operates the heating unit 313 of each zone of the cylinder 310 to heat the cylinder 310 in order to melt the molding material to be filled in the mold unit 800. However, there is a time lag when the temperature of the molding material reaches a temperature of the cylinder 310. In particular, when the heating units 313 are started, there is a large difference in temperature therebetween. Therefore, when the injection molding machine 10 is started, the injection control unit 713 performs the cold start prevention control to restrict (interlock) an operation of a plasticizing member (for example, a movement operation or a rotation operation of the screw 330) of the injection unit 300 until the temperature of the molding material in each zone reaches the temperature of the cylinder 310. For example, the injection motor 350 is an example of a target of the interlocking, and the injection unit 300 cuts off power supply to the injection motor 350 in terms of hardware or software. In the cold start prevention control, the injection control unit 713 reads a cold start prevention period stored in advance in the storage medium 702, and stops the rotation of the injection motor 350 during the cold start prevention period. A time at which the interlocking is applied in the mold clamping unit 100 may be set as desired, and for example, may be before the mold closing process is performed.

The cold start prevention period is time information while the operation of the plasticizing member is restricted, and an initial value (initial cold start prevention period) thereof is stored in advance in the storage medium 702 based on a configuration of the injection unit 300, a kind of molding material, or the like. For example, the cold start prevention period may be set to 15 minutes. The initial value of the cold start prevention period may be input by the user, or may be automatically set by the injection molding machine 10 by acquiring information on the kind of molding material.

Here, there are cases where the injection molding machine 10 is temporarily stopped during the operation and then restarted. Examples of the temporary stop of the operation include a power failure, an error in pressing an operation button by the user (operation error), an abnormal stop of the device, and a change in a set temperature of the device. In a case where the filling process is interlocked over the initial value of the cold start prevention period during this restart, the process cannot proceed to the filling process even though the temperature of the molding material reaches the temperature of the cylinder 310, and it takes time to perform the restart. As a result, work efficiency decreases.

Therefore, in the injection molding machine 10 according to the present embodiment, in the restart after the operation is temporarily stopped, the cold start prevention period is appropriately adjusted to shorten the time required for the restart. In addition, even in a case where the set temperature of the cylinder 310 is raised during the operation of the injection molding machine 10, a temperature difference occurs between the temperature of the cylinder 310 and the temperature of the molding material. Therefore, the injection molding machine 10 performs the cold start prevention control and the adjustment of the cold start prevention period even when the temperature rises due to the change in the set temperature of the cylinder 310.

Specifically, as shown in FIG. 3, the control device 700 has a period setting unit 715 configured to adjust the cold start prevention period. The period setting unit 715 acquires the temperature measured by the temperature measurer 314 in a predetermined zone of the cylinder 310, and stores the temperature in the storage medium 702. At this time, the period setting unit 715 generates temperature-time data TD in which the time measured by the control device 700 and the temperature stored in the storage medium 702 are associated with each other, and stores the temperature-time data TD in the storage medium 702.

Figure 5:
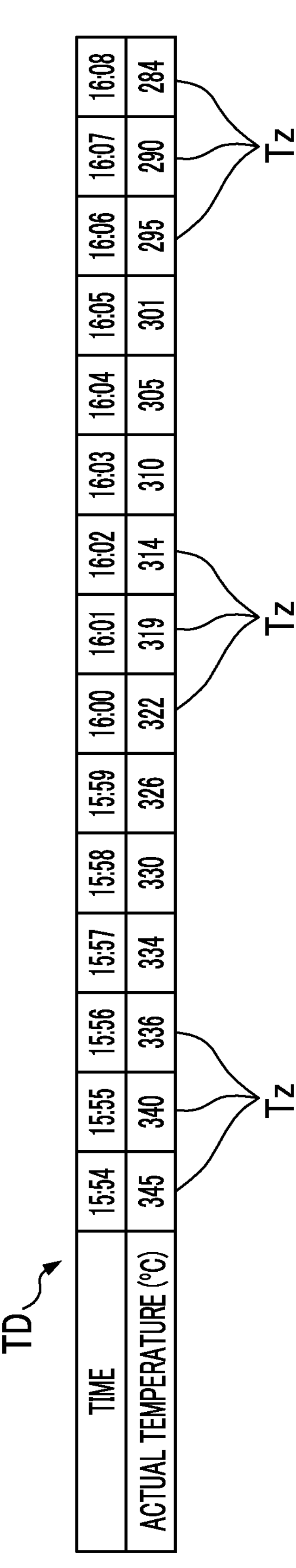
FIG. 5 is a diagram showing an example of temperature-time data stored in a storage medium.

FIG. 5 is a diagram showing an example of the temperature-time data TD stored in the storage medium 702. As shown in FIG. 5, the temperature-time data TD has a one-to-one correspondence between the temperature measured by the temperature measurer 314 during the injection molding or the like and the measured time. As described above, by using actual temperatures (individual data in which the temperature measured by the temperature measurer 314 and the time are associated with each other), for example, a temperature history can be tracked and analyzed, and the time when an event such as an abnormality occurs can be specified.

A temperature sampling interval is not particularly limited, and, for example, may be set to every 10 seconds, every 30 seconds, every 1 minute, or every 3 minutes. The sampling interval may be a predetermined fixed value or may be changed by the user. The period setting unit 715 may automatically change the sampling interval according to the process of the injection molding machine 10 or the like.

In addition, the temperature measurer 314 in the target zone for storing the temperature is not particularly limited, and, for example, the front end portion (for example, the fourth zone) of the cylinder body 315 is more preferable. This is because the inside of the front end portion of the cylinder body 315 is a region in which the molding material is in a molten state, and in a case where the molding material in this portion is insufficiently melted, a load larger than expected is applied, which leads to damage to the plasticizing member (a screw head of a tip of the screw 330, the backflow prevention ring 331, a three-piece set of a seat ring, the cylinder body 315, the nozzle 320, and the like). Hereinafter, a configuration in which the period setting unit 715 acquires the temperature of the temperature measurer 314 in the fourth zone will be described as an example.

While the injection unit 300 is in operation, the period setting unit 715 continuously samples the temperature of the temperature measurer 314 and stores the temperature in the storage medium 702. Then, the period setting unit 715 performs the cold start prevention control in a case where the operation of the injection molding machine 10 is temporarily stopped and then restarted, in a case where the temperature of the cylinder 310 is raised in accordance with a change in the set temperature of the cylinder 310, or the like. At this time, the period setting unit 715 compares the actual temperature of the temperature-time data TD stored in the storage medium 702 before a predetermined time with the set temperature of the zone in which the temperature-time data TD is stored, and sets a length of the cold start prevention period. The setting of the cold start prevention period includes, in addition to automatically adjusting the cold start prevention period via the control device 700, limiting an input range when the cold start prevention period is input.

In addition, the control device 700 has a notification control unit 720 as shown in FIG. 3. The notification control unit 720 causes the display device 760 to display various kinds of information on the operation of the injection molding machine 10 and image information such as an error when an abnormality occurs. In addition, the notification control unit 720 has a function of notifying the user of the information via the display device 760 in the case where the length of the cold start prevention period is adjusted. Accordingly, the user can easily recognize the adjusted cold start prevention period.

Figure 6:
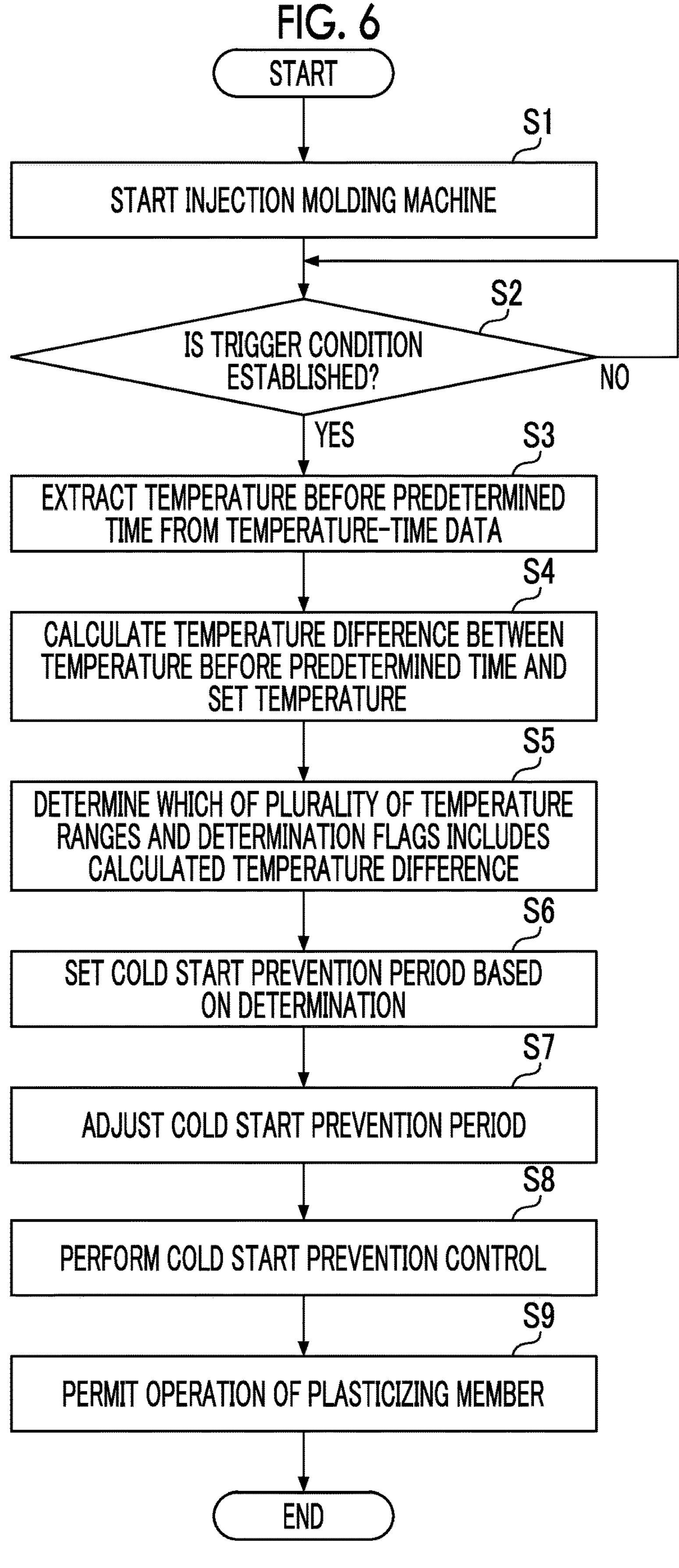
FIG. 6 is a flowchart showing a processing flow for setting a cold start prevention period.

Hereinafter, a processing for adjusting the cold start prevention period will be described with reference to FIG. 6. FIG. 6 is a flowchart showing a processing flow for setting the cold start prevention period.

The injection molding machine 10 is started by a user's operation to start the machine (step S1). Along with this start, the control device 700 is also started, and the CPU 701 executes the program stored in the storage medium 702, whereby the processing by the period setting unit 715 becomes possible.

The period setting unit 715 formed inside the control device 700 determines whether or not a trigger condition for adjusting the cold start prevention period is established during the operation of the injection molding machine 10 (step S2). For example, as the trigger condition, any one of the following (a) to (c) is satisfied.

(a) The heater (each heating unit 313) is changed from an OFF state to an ON state.

(b) A heater selection control is changed and a heater control is turned on.

(c) The set temperature of the heater is changed and the temperature of the heater is being raised.

The trigger condition of (a) is a condition when the operation of the heater is stopped when the operation is stopped, but a heating operation of the heater is also restarted when the operation is restarted. That is, in a case where the device is temporarily stopped and then restarted, the heater is switched from the OFF state to the ON state. Therefore, this trigger condition is satisfied.

The heater selection control of the trigger condition of (b) means to select any one of a plurality of modes for heating the cylinder 310 of the injection unit 300. Examples of the plurality of modes include "molding" which is a temperature when actually performing the injection molding, "heat retention" which is a temperature when waiting for the injection molding, and "purge" which is a temperature when discharging the molding material. In a case where these modes are changed, there is a possibility that a difference occurs between the temperature of the cylinder 310 and the actual temperature of the molding material. Therefore, the injection control unit 713 performs the cold start prevention control, and adjusts the cold start prevention period at this time.

In a case where it is necessary to raise the temperature of the cylinder 310 in response to a change in the mode, the injection control unit 713 operates the heater to heat the cylinder 310. Examples of the case where it is necessary to raise the temperature of the cylinder 310 in response to a change in the mode include a case where "heat retention" is changed to "molding", and a case where "purge" is changed to "heat retention" or "molding". At this time, since the actual temperature of the molding material does not immediately follow the temperature of the cylinder 310, a temperature difference occurs. On the contrary, in a case where it is necessary to lower the temperature of the cylinder 310 in response to a change in the mode, the injection control unit 713 stops the heating operation of the heater to dissipate heat from the cylinder 310.

FIG. 7 is a diagram showing a decision table of the trigger condition in the heater selection control. When determining the trigger condition, the period setting unit 715 monitors a signal of mode selection and a signal of the heater control (heating operation) with reference to the decision table as shown in FIG. 7. Then, in a case where the mode selection is changed and the heater control is turned on, the period setting unit 715 sets a flag indicating that the trigger condition is established.

The trigger condition of (c) is a case where the set temperature of the heater (each heating unit 313) is changed as desired by the user and the temperature of the heater is raised. The raising of the temperature of the heater means a state in which the temperature of the cylinder becomes equal to or more than a predetermined difference after the setting is changed. Even in this case, a difference occurs between the temperature of the cylinder 310 and the temperature of the molding material. Therefore, the period setting unit 715 performs the cold start prevention control and adjusts the cold start prevention period at this time.

That is, the trigger conditions of (b) and (c) are conditions for determining the temperature rise associated with the change in the set temperature of the cylinder 310. As described above, the period setting unit 715 also includes the case where the set temperature of the heating unit 313 is changed in the trigger condition, thereby appropriately adjusting the cold start prevention period in response to various situations in which a difference between the temperature of the cylinder 310 and the temperature of the molding material may occur.

Returning to FIG. 6, in a case where the above trigger condition is established (YES in step S2), the period setting unit 715 proceeds to step S3, which is a processing flow for adjusting the cold start prevention period. On the other hand, in a case where the trigger condition is not established (NO in step S2), the period setting unit 715 repeats the determination in step S2 during the operation of the injection molding or the like, thereby continuously monitoring the trigger condition. Then, in the case where the trigger condition is established during the operation of the injection molding or the like, the process proceeds to step S3.

In step S3, the period setting unit 715 extracts an actual temperature Tz before a predetermined time from a point of time at which the trigger condition is established with reference to the temperature-time data TD stored in the storage medium 702 as data for determining whether or not the cold start prevention period can be shortened. As described above, the temperature-time data TD of the storage medium 702 is obtained by measuring the temperature of a predetermined zone (for example, the fourth zone) of the cylinder 310 via the temperature measurer 314.

In addition, "before a predetermined time" for designating the extraction time in the temperature-time data TD is set to an appropriate value based on the time for the temperature of the molding material inside the cylinder 310 to be sufficiently raised after the actual temperature of the cylinder 310 reaches the set temperature of the heating unit 313. This "before a predetermined time" is set in advance based on an experiment, a simulation, or an experience, or as desired by the user.

Next, the period setting unit 715 compares the extracted actual temperature Tz before a predetermined time with the set temperature Ts for a current temperature adjustment in the predetermined zone. In the temperature comparison, the period setting unit 715 calculates a temperature difference TG obtained by subtracting the actual temperature Tz before a predetermined time from a current set temperature Ts (step S4). Then, the period setting unit 715 determines which of a plurality of set temperature ranges and determination flags includes the calculated temperature difference TG (step S5). Examples of the plurality of temperature ranges and determination flags include the following patterns.

(1) $TG<T1$ . . . Determination 0

(2) $T1 \leq TG<T2$ . . . Determination 1

(3) $T2 \leq TG$ . . . Determination 2

T1 and T2 for specifying the temperature ranges correspond to predetermined temperature thresholds for determining the temperature difference TG. A relationship of $T1<T2$ is established between the temperature threshold T1 and the temperature threshold T2. Here, in a case where the temperature difference TG in (1) is less than T1, it can be said that the difference between the actual temperature Tz before a predetermined time and the set temperature Ts is small. Therefore, the period setting unit 715 sets Determination 0 as the determination flag, and performs a processing of setting the cold start prevention period to zero. In a case where the temperature difference TG in (2) is T1 or more and less than T2, it can be said that the difference between the actual temperature Tz before a predetermined time and the set temperature Ts is slightly large. Therefore, the period setting unit 715 sets Determination 1 as the determination flag and performs a processing of shortening the cold start prevention period. A case where the temperature difference TG in (3) is T2 or more, it can be said that the difference between the actual temperature Tz before a predetermined time and the set temperature Ts is sufficiently large. Therefore, the period setting unit 715 sets Determination 2 as the determination flag and uses the initial value of the cold start prevention period as it is. In a case where there is no temperature-time data TD before a predetermined time in step S3, the period setting unit 715 cannot adjust the cold start prevention period. Therefore, also in this case, the period setting unit 715 sets Determination 2 as the determination flag, and uses the initial value of the cold start prevention period as it is.

When any one of Determination 0, Determination 1, and Determination 2 is determined in step S4, the period setting unit 715 sets the cold start prevention period based on this determination (step S6). The cold start prevention period is a period during which the cold start prevention control for interlocking the configuration (the injection motor 350) of the injection molding machine 10 is performed. The period setting unit 715 allows the plasticizing member to operate when the period during which the interlocking is performed reaches the cold start prevention period. For example, the period setting unit 715 does not apply the cold start prevention period in the case of Determination 0, sets the cold start prevention period to a period (second period) shorter than the initial value in the case of Determination 1, and maintains the cold start prevention period at the initial value (first period) in the case of Determination 2. The number of temperature ranges and determination flags for adjusting the cold start prevention period is not limited to three, and may be at least two. Accordingly, the first period can be set in the case where the temperature difference TG obtained by subtracting the actual temperature Tz before a predetermined time from the current set temperature Ts is equal to or more than the predetermined temperature threshold, and the second period can be set in the case where the temperature difference TG is less than the predetermined temperature threshold. Alternatively, as a matter of course, the number of temperature ranges and determination flags may be 4 or more.

Thereafter, the period setting unit 715 adjusts (changes or maintains) the cold start prevention period set to the initial value to the cold start prevention period set in step S6 (step S7). At this time, the injection molding machine 10 may be configured to automatically change the cold start prevention period in the period setting unit 715, or may be configured to notify the user of an input range of the cold start prevention period in which the setting can be changed so that the user determines and changes the cold start prevention period based on the input range. In the case of automatically changing the cold start prevention period, the notification control unit 720 (see FIG. 3) receives information from the period setting unit 715 and notifies the user of a setting state of the cold start prevention period. For example, the notification control unit 720 changes a color of the cold start prevention period on a display screen of the display device 760, thereby visually notifying the user of the change. Accordingly, the user can easily recognize the period during which the injection molding is interlocked. Alternatively, the notification control unit 720 may generate a pop-up screen on the display screen, or may notify of the change by turning on an alarm sound, a sound output, a lamp, or the like. In addition, in the case where the user makes the determination, notification of information indicating that the cold start prevention period can be changed may be sent, and thereafter, after the cold start prevention period is changed by the user, notification of information indicating that setting of the cold start prevention period is completed may be sent.

Then, the injection control unit 713 performs the cold start prevention control based on the cold start prevention period set in the period setting unit 715 (step S8). Alternatively, in the case where the cold start prevention period is zero, the injection control unit 713 does not perform the cold start prevention control.

The injection control unit 713 performs interlocking for the cold start prevention period set in the cold start prevention control, and thereafter permits the operation of the plasticizing member (step S9). Accordingly, the injection molding machine 10 can immediately perform the operation set by the user (the filling process, purging including the plasticizing process, the molding mode, and the like) after the cold start prevention control is performed. For example, the injection control unit 713 starts a purging operation after the operation of the plasticizing member is permitted. Accordingly, the injection unit 300 can stably mold the molding product without applying a large load to the plasticizing member or to the mold unit 800.

In a case where data of the actual temperature Tz before a predetermined time is absent in the temperature-time data TD stored in the storage medium 702, the injection control unit 713 may calculate the actual temperature Tz before a predetermined time by using temperature-time data TD before and after the predetermined time. Examples of the case where data of the actual temperature Tz before a predetermined time is absent include a stop of the operation of the device (including a power failure), a temporary failure of the temperature measurer, a communication function, and the like.

Figures 8A, 8B:
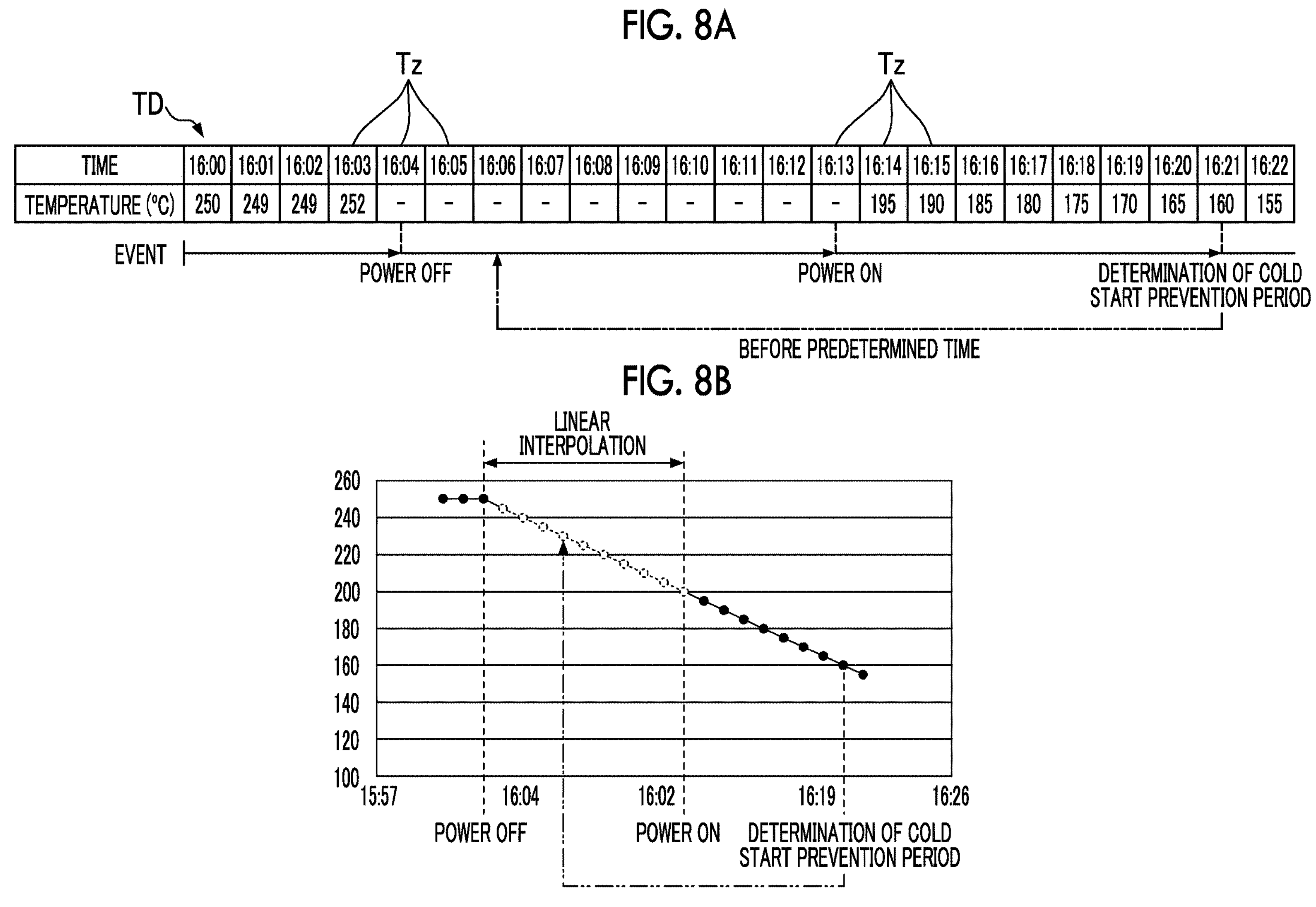
FIGS. 8A and 8B are diagrams for describing interpolation of the temperature-time data.

FIGS. 8A and 8B are diagrams for describing interpolation of the temperature-time data TD, in which FIG. 8A is a table illustrating the temperature-time data TD, and FIG. 8B is a graph of FIG. 8A. As shown in FIGS. 8A and 8B, when the injection control unit 713 reads a temperature before a predetermined time in the temperature-time data TD stored in the storage medium 702 to adjust the cold start prevention period, in a case where the actual temperature Tz before a predetermined time is absent (blank), temperatures and times before and after the blank period are read. Then, the injection control unit 713 linearly interpolates a temperature in the blank period based on the temperature immediately before the blank period and on the temperature immediately after the blank period.

In the example of FIGS. 8A and 8B, after the power of the injection molding machine 10 is turned off at 16:04, the power of the injection molding machine 10 is turned on at 16:13. Therefore, there is a blank period in which there is no temperature information from 16:04 to 16:13. Then, the injection control unit 713 determines the adjustment of the cold start prevention period at 16:21. In the determination of the cold start prevention period, there is no temperature information even if an attempt is made to extract the actual temperature Tz before 15 minutes (16:06) as a predetermined time.

Therefore, the injection control unit 713 extracts a temperature (250° C.) at 16:03, which is the temperature measured immediately before the power is turned off, and a temperature (195° C.) at 16:14, which is the temperature detected immediately after the power is turned on. The injection control unit 713 calculates an imaginary line of a temperature that linearly decreases based on the period from 16:03 to 16:14 and on the two temperatures, 250° C. and 195° C. Then, the injection control unit 713 extracts 235° C., which is the temperature at 16:06, based on the calculated imaginary line.

As described above, even in a case where the actual temperature Tz before a predetermined time is absent in the storage medium 702, the injection control unit 713 can smoothly and accurately obtain a temperature sufficiently close to the actual temperature Tz before a predetermined time by interpolating the temperature of the blank period without the actual temperature Tz. The injection molding machine 10 can satisfactorily adjust the cold start prevention period by using the actual temperature Tz before a predetermined time.

As described above, in the injection molding machine according to the present embodiment, in a case where there is a difference between the temperature of the cylinder 310 and the temperature of the molding material, the cold start prevention period, which is a period for restricting the operation of the plasticizing member (for example, the movement operation or the rotation operation of the screw 330) can be simply and appropriately adjusted by the period setting unit 715. For example, in a case where the operation of the injection molding machine 10 is temporarily stopped due to a power failure, an operation error, or the like and then restarted at a stage where the temperature of the cylinder 310 does not greatly decrease, the period setting unit 715 shortens the cold start prevention period. Accordingly, the injection molding machine 10 can shorten the time required to fill the molding material while protecting the plasticizing member such as the screw 330. Therefore, the injection molding machine 10 can be restored at an early stage despite the stop of the device for a short period of time, and can reduce the amount of the molding material consumed at the time of starting.

In addition, the period setting unit 715 can easily adjust the cold start prevention period by comparing the past actual temperature Tz with the set temperature of the heating unit 313. In this comparison, the period setting unit 715 can set a more optimum cold start prevention period by using the temperature difference TG obtained by subtracting the past actual temperature Tz from the current set temperature Ts. Furthermore, in a case where the past actual temperature Tz is close to the set temperature, the injection molding machine 10 can further shorten the filling of the mold unit 800 with the molding material by shortening the cold start prevention period.

The injection molding machine 10 includes the temperature measurer 314 for adjusting the cold start prevention period in the front end portion of the cylinder 310, so that a state of the molding material in the front end portion of the cylinder 310 in which a load is easily applied to the plasticizing member can be easily monitored.

The injection molding machine 10 and the control device 700 of the injection molding machine 10 according to the embodiment of the present invention are not limited to the embodiment, and various modification examples can be adopted. For example, the injection molding machine 10 is not limited to installing the temperature measurer 314 in the cylinder 310, and may be configured to measure the temperature of the mold unit 800 via the temperature measurer installed in the mold unit 800 (the stationary mold 810 or the like). When the molding material is injected from the injection molding machine into the mold in a state where the temperature of the mold unit 800 does not fall within the set temperature range, there is a possibility that the mold has a poor filling state, for example, the mold is bitten, the molding product is not released from the mold, or burrs are generated. In particular, in a case where the injection molding machine performs thermal curing molding (reaction molding), there are problems in that the molding material does not normally solidify, functional performance required for the molding product cannot be obtained, and the like. Therefore, by measuring the temperature of the mold unit 800, setting the cold start prevention period based on the temperature of the mold unit 800, and restricting one or more of the operation of the mold unit 800 or the operation of the plasticizing member, the poor filling state can be stably suppressed.

In this case, the temperature control mechanism of the mold unit 800 is not limited to the heater, and may have a configuration in which a temperature control medium is circulated between a temperature control medium circulation device (not shown) and the mold unit 800. The configuration in which the temperature control medium is circulated may be applied to the cylinder 310.

In the case of the configuration in which the temperature control medium is circulated, in the injection molding machine 10, when the actual temperature Tz before a predetermined time stored in the storage medium 702 is higher than the set temperature, the cylinder 310 may be cooled by the temperature control medium supplied to the cylinder 310. In addition, the injection molding machine 10 may interlock the operation of the device during this period, or may set the interlocking period based on the actual temperature Tz.

In the embodiment, the period setting unit 715 sets the cold start prevention period associated with the plurality of temperature ranges and the determination flags by using the temperature difference TG. However, for example, the period setting unit 715 may linearly change the cold start prevention period by using a mathematical expression in which the temperature difference TG and the cold start prevention period are associated with each other.

The injection molding machine 10 and the control device 700 of the injection molding machine 10 according to the embodiment disclosed herein are examples in all respects and are not limiting. The embodiment can be modified and improved in various forms without departing from the scope of the claims and the scope thereof. Items described in the plurality of embodiments may have other configurations within a consistent range, and may be combined within a consistent range.

It should be understood that the invention is not limited to the above-described embodiment, but may be modified into various forms on the basis of the spirit of the invention. Additionally, the modifications are included in the scope of the invention.

What is claimed is:

1. A control device of an injection molding machine, in which the control device allows a temperature measurer to measure a temperature of a cylinder that holds a molding material to be injected into a mold or a temperature of the mold and allows a temperature control mechanism to adjust the temperature of the cylinder or of the mold based on the temperature measured by the temperature measurer, the control device comprising:

one or more processors; and a non-transitory storage medium storing instructions thereon, the instructions when executed by the one or more processors causing the one or more processors to:

store temperature-time data in which the temperature measured by the temperature measurer is associated with time, determine an actual temperature at a time point that is a predetermined time prior to a current time based on the stored temperature-time data, calculate a temperature difference between the determined actual temperature and a current set temperature, and set a cold start prevention period based on the calculated temperature difference, the cold start prevention period being configured for restricting an operation of a plasticizing member provided in the cylinder so as to be movable and rotatable, until a temperature of the molding material or the temperature of the mold rises, wherein, in a case where temperature information at the time point is absent in the stored temperature-time data due to a blank period in which no temperature information is present between a time at which power of the injection molding machine is turned off and a time at which the power of the injection molding machine is turned on, the instructions cause the one or more processors to calculate, as the actual temperature at the time point, a temperature during the blank period by interpolating a temperature in the blank period.

2. The control device of an injection molding machine according to claim 1, wherein the instructions, when executed by the one or more processors, further cause the one or more processors to notify a user of information for changing the setting of the cold start prevention period or information for limiting an input range.

3. A control device of an injection molding machine, in which the control device allows a temperature measurer to measure a temperature of a cylinder that holds a molding material to be injected into a mold or a temperature of the mold and allows a temperature control mechanism to adjust the temperature of the cylinder or of the mold based on the temperature measured by the temperature measurer, the control device comprising:

one or more processors; and a non-transitory storage medium storing instructions thereon, the instructions when executed by the one or more processors causing the one or more processors to:

store temperature-time data in which the temperature measured by the temperature measurer is associated with time, determine whether a predetermined condition for adjusting a cold start prevention period for restricting an operation of a plasticizing member provided in the cylinder so as to be movable and rotatable until a temperature of the molding material or the temperature of the mold rises is established during an operation of the injection molding machine, when the predetermined condition is established, determine an actual temperature at a time point that is a predetermined time prior to a point of time at which the predetermined condition is established based on the stored temperature-time data, calculate a temperature difference between the determined actual temperature and a current set temperature, and set the cold start prevention period to a first period when the calculated temperature difference is equal to or more than a predetermined temperature value, and set the cold start prevention period to a second period when the calculated temperature difference is less than the predetermined temperature value, wherein, in a case where temperature information at the time point is absent in the stored temperature-time data due to a blank period in which no temperature information is present between a time at which power of the injection molding machine is turned off and a time at which the power of the injection molding machine is turned on, determining the actual temperature includes calculating, as the actual temperature at the time point, a temperature during the blank period by interpolating a temperature in the blank period.

4. The control device of an injection molding machine according to claim 3, wherein the predetermined condition is one of the following:

a heater is changed from an OFF state to an ON state;

a heater selection control is changed and a heater control is turned on; and a set temperature of the heater is changed and a temperature of the heater is being raised.

5. The control device of an injection molding machine according to claim 1, wherein interpolating the temperature in the blank period comprises:

extracting, from the stored temperature-time data, a first temperature detected before the power of the injection molding machine is turned off and a second temperature detected after the power of the injection molding machine is turned on; and calculating, as the actual temperature at the time point, the temperature during the blank period based on the first temperature and the second temperature.

6. The control device of an injection molding machine according to claim 5, wherein interpolating the temperature in the blank period further comprises:

calculating an imaginary line of a temperature that linearly decreases based on a period from a first time at which the first temperature is detected to a second time at which the second temperature is detected and on the first temperature and the second temperature.

7. The control device of an injection molding machine according to claim 3, wherein interpolating the temperature in the blank period comprises:

extracting, from the stored temperature-time data, a first temperature detected before the power of the injection molding machine is turned off and a second temperature detected after the power of the injection molding machine is turned on; and calculating, as the actual temperature at the time point, a temperature during the blank period based on the first temperature and the second temperature.

8. The control device of an injection molding machine according to claim 7, wherein interpolating the temperature in the blank period further comprises:

calculating an imaginary line of a temperature that linearly decreases based on a period from a first time at which the first temperature is detected to a second time at which the second temperature is detected and on the first temperature and the second temperature.

* * * * *